US012321492B2

(12) United States Patent
Summers et al.

(10) Patent No.: US 12,321,492 B2
(45) Date of Patent: Jun. 3, 2025

(54) COGNITIVE ITERATIVE MINIMIZATION OF PERSONALLY IDENTIFIABLE INFORMATION IN ELECTRONIC DOCUMENTS

(71) Applicant: International Business Machines Corporation, Armonk, NY (US)

(72) Inventors: Kristen M. Summers, Takoma Park, MD (US); Stephen A. Boxwell, Columbus, OH (US); Keith G. Frost, Delaware, OH (US); Kyle M. Brake, Dublin, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 16/458,462

(22) Filed: Jul. 1, 2019

(65) Prior Publication Data

US 2021/0004485 A1    Jan. 7, 2021

(51) Int. Cl.
  *G06F 40/295*    (2020.01)
  *G06F 21/62*     (2013.01)
  *G06F 40/30*     (2020.01)

(52) U.S. Cl.
  CPC ........ *G06F 21/6254* (2013.01); *G06F 40/295* (2020.01); *G06F 40/30* (2020.01)

(58) Field of Classification Search
  CPC ..... G06F 21/6245; G06F 40/295; G06F 40/30
  (Continued)

(56) References Cited

U.S. PATENT DOCUMENTS 6,668,325 B1 * 12/2003 Collberg .............. G06F 21/14
                                                    726/26
8,930,178 B2    1/2015 Pestian et al.
(Continued)

FOREIGN PATENT DOCUMENTS

CN    104699741 A    6/2015
CN    105144205 A    12/2015

OTHER PUBLICATIONS

Boxwell, Stephen A. et al., "Determining Answers to a Question that Includes Multiple Foci", filed May 2, 2018, U.S. Appl. No. 15/969,154.
(Continued)

*Primary Examiner* — Stephen S Hong
*Assistant Examiner* — Tionna M Burke
(74) *Attorney, Agent, or Firm* — Harrity & Harrity, LLP

(57) ABSTRACT

Mechanisms are provided to minimize personally identifiable information (PII) in an electronic document. An iterative personally identifiable information minimization (IPIIM) engine receives an electronic document comprising natural language content having a mention of a protected entity and obfuscates the mention of the protected entity to thereby generate a minimized natural language content. A question answering system processes the minimized natural language content to generate a listing of candidate answers and corresponding confidence scores and the IPIIM engine determines whether or not the minimized natural language content is sufficiently obfuscated based on the listing of candidate answers and corresponding confidence scores. In response to determining that the minimized natural language content is sufficiently obfuscated, the minimized natural language content is provided for processing by a requestor computing device.

20 Claims, 5 Drawing Sheets

(58) Field of Classification Search
USPC .......................................................... 726/26
See application file for complete search history.

(56) References Cited

U.S. PATENT DOCUMENTS

| | | | |
|---|---|---|---|
| 9,965,548 | B2 | 5/2018 | Haggar et al. |
| 10,095,727 | B2 | 10/2018 | Waltinger |
| 2008/0016372 | A1 | 1/2008 | Staddon et al. |
| 2009/0164878 | A1 | 6/2009 | Cottrille |
| 2010/0070396 | A1 | 3/2010 | Schrichte |
| 2010/0306854 | A1* | 12/2010 | Neergaard .......... G06F 21/6254 726/26 |
| 2011/0125734 | A1 | 5/2011 | Duboue et al. |
| 2011/0247081 | A1 | 10/2011 | Shelton |
| 2014/0317049 | A1 | 10/2014 | DeRoller |
| 2015/0039579 | A1 | 2/2015 | Clark et al. |
| 2015/0100564 | A1* | 4/2015 | Clark .................. G06F 16/367 707/709 |
| 2016/0110352 | A1 | 4/2016 | Bendersky et al. |
| 2017/0351663 | A1 | 12/2017 | Sordoni et al. |

OTHER PUBLICATIONS

Boxwell, Stephen A. et al., "Efficient Resolution of Syntactic Patterns in Question and Answer Pairs in an N-Ary Focus Cognitive QA System", filed Oct. 23, 2018, U.S. Appl. No. 16/168,718.

Boxwell, Stephen A. et al., "Identification of Multiple Foci for Topic Summaries in a Question Answering System", filed Nov. 7, 2018, U.S. Appl. No. 16/182,877.

High, Rob, "The Era of Cognitive Systems: An Inside Look at IBM Watson and How it Works", IBM Corporation, Redbooks, Dec. 12, 2012, 16 pages.

Kargupta, Hillol et al., "Privacy Sensitive Distributed Data Mining from Multi-party Data", International Conference on Intelligence and Security Informatics. Springer, Berlin, Heidelberg, 2003, pp. 336-342.

Nagaraj, Kalyan et al., "Identification of network communities and assessment of privacy using hybrid algorithm", 2017 2nd International Conference on Computational Systems and Information Technology for Sustainable Solution (CSITSS). IEEE, Dec. 2017, pp. 44-48.

Perez-Lainez, Rebeca et al., "Anonimytext: Anonimization of Unstructed Documents", Proceedings of the International Conference on Knowledge Discovery and Information Retrieval, Oct. 6-8, 2009. First International Joint Conference, IC3K 2009, Funchal, Madeira, Portugal, 5 pages.

Ruch, Patrick et al., "Medical Document Anonymization with a Semantic Lexicon", Proceedings of the AMIA Symposium. American Medical Informatics Association, 2000, pp. 729-733.

Szarvas, Gyorgy et al., "State-of-the-art Anonymization of Medical Records Using an Iterative Machine Learning Framework", Journal of the American Medical Informatics Association 14.5 (2007): 574-580.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, 14 pages.

Chinese Patent Office, "Second Office Action issued," Jul. 6, 2024, 18 Pages, Application No. 202010332591.8.

Notification of the Third Office Action dated Sep. 24, 2024 received from the National Intellectual Property Administration, PRC for Application No. 202010332591.8, 11 pages.

\* cited by examiner

COGNITIVE ITERATIVE MINIMIZATION OF PERSONALLY IDENTIFIABLE INFORMATION IN ELECTRONIC DOCUMENTS

This invention was made with government support under 2018-18010800001 awarded by Watson@GovL. The government has certain rights to this invention.

BACKGROUND

The present application relates generally to an improved data processing apparatus and method and more specifically to mechanisms for providing mechanisms to cognitively and iteratively minimize personally identifiable information present in an electronic document to a point where the redacted personally identifiable information is no longer recoverable.

Anonymization of data is an important consideration in today's computer oriented society where individual privacy may be relatively easily circumvented using computerized mechanisms. That is, through websites, databases, directories, and the like, personal information for individuals is collected and made accessible for legitimate uses, but can also be exploited for illegitimate uses. Individual privacy is becoming a more important issue as identity theft and other illegal access to personal information becomes more rampant. Furthermore, governmental regulations require that certain types of data about individuals, such as medical history information, be kept secure.

Known anonymization systems and techniques essentially utilize a pattern matching or keyword search to identify standardized pieces of information to obfuscate or eliminate them from being able to be returned as results of a query. In more structured systems, a type of field basis may be used for identifying fields containing personally identifiable information. In general, these systems identify fields in data, such as names, addresses, zip codes, etc., that are determined to be fields that may be used to individually identify a particular person, and programmatically obfuscate or eliminate these fields from being able to be returned as results of a query.

In known minimization tasks, or anonymization tasks, the identified personally identifiable information (PII) is redacted or replaced with placeholders. For example, before medical records are passed to a researcher, they can have the PII in the medical records carefully removed so as to protect the privacy of the patients. Similarly, in the field of legal discovery, PII that is not relevant to the proceedings may be redacted before documents are revealed to the opposing side. This approach is tedious when performed by human beings, and is prone to error when done using known anonymization or minimization techniques as the known anonymization or minimization techniques often do not take into account all the possible combinations of information that may be used to personally identify an individual and are limited to identifying particular statically specified fields and data types. For example, while a known anonymization technique may redact a patient's name, age, address, social security number, etc. from their medical record, known anonymization techniques cannot recognize that the patient may still have their identity inadvertently revealed if they are the only patient that was treated for a rare disorder at a particular hospital within a certain time frame.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions executed by the at least one processor to cause the at least one processor to minimize personally identifiable information (PII) in an electronic document. The method comprises receiving, by an iterative personally identifiable information minimization (IPIIM) engine executing in the data processing system, an electronic document comprising natural language content having a mention of a protected entity. The method further comprises applying, by the IPIIM engine, natural language processing and analytic analysis on the natural language content to obfuscate the mention of the protected entity and thereby generate a first minimized natural language content. Moreover, the method comprises processing, by a question answering computing system, the first minimized natural language content to generate a first listing of one or more candidate answers and corresponding confidence scores and determining, by the IPIIM engine, whether or not the first minimized natural language content is sufficiently obfuscated based on the first listing of one or more candidate answers and corresponding confidence scores. Furthermore, in response to determining that the first minimized natural language content is sufficiently obfuscated, the method comprises providing the first minimized natural language content as a final minimized natural language content of the electronic document for processing by a requestor computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
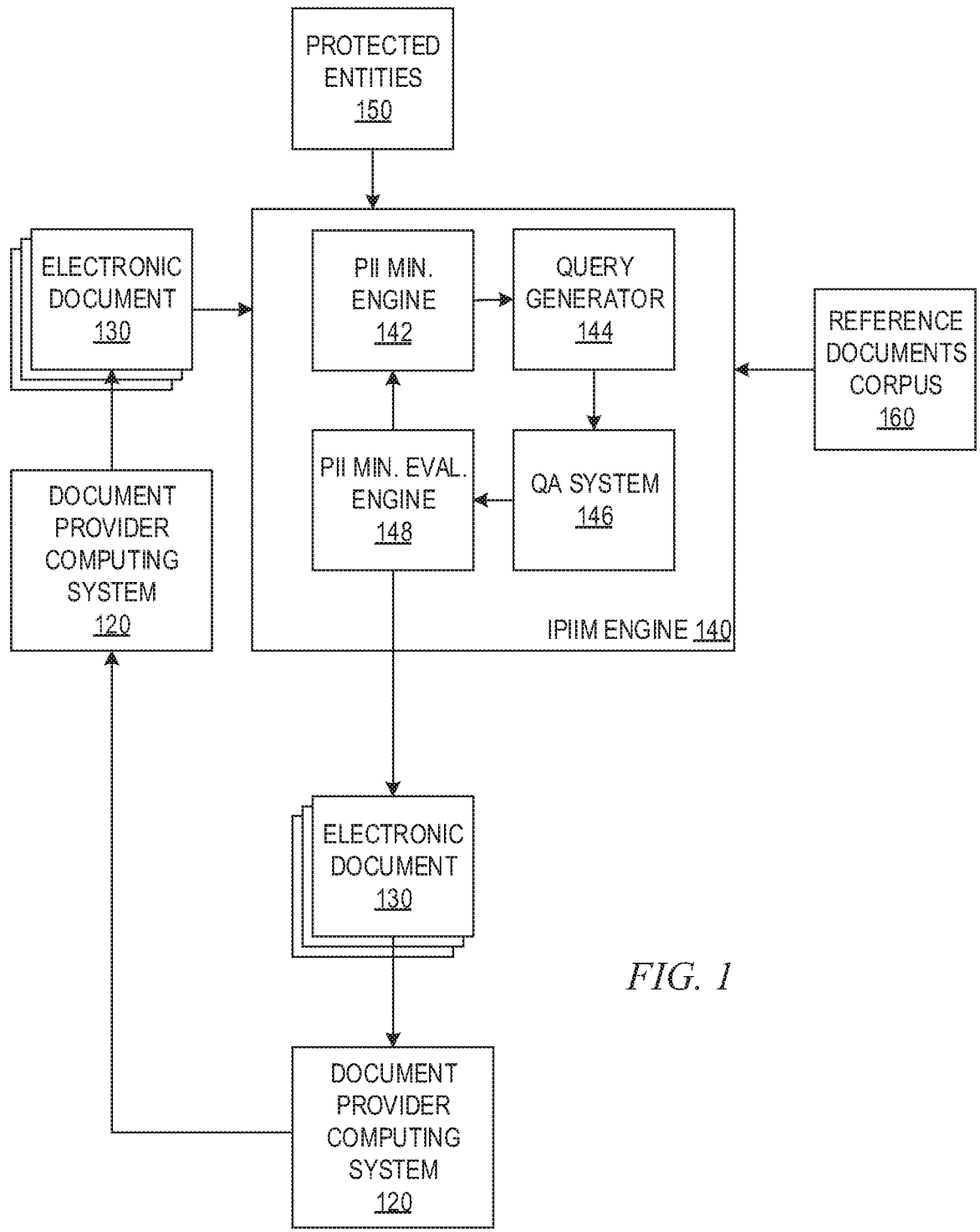
FIG. 1 is an example block diagram of the primary operational components of an iterative personally identifiable information minimization (IPIIM) engine in accordance with one illustrative embodiment.

Protecting the privacy of a person's sensitive information, such as the person's medical information as may be stored in an electronic medical record (EMR), legal information as may be stored in data structures or records associated with a court, attorney's office, or government agency, or any other collection of personal information, for example, is of significant importance in any computing system, to not only protect the individual but also to avoid liability under governmental law. However, for many situations, access to actual data records comprising actual data regarding individuals is necessary in order to ensure proper operation of computing systems, development of applications, and the like. For example, many times, for development purposes, human computer application developers must work with the actual data records of actual individuals to further develop or increase the quality of the computer application being developed. In order for these developers to be able to perform their necessary tasks, while maintaining the privacy of the individuals whose data is being utilized, the sensitive data, i.e. the personally identifiable information (PII), should be minimized or obfuscated. However, this minimization or obfuscation should be done in such a way as to permit the development operations to proceed unhindered. In the same way, runtime applications should also be able to operate on patient data that has been minimized or obfuscated in an unhindered manner such that they may perform their operations while maintaining the privacy of the individual.

The illustrative embodiments provide mechanisms to automatically and iteratively minimize or obfuscate (hereafter referred to as "minimization") personally identifiable information (PII) in an electronic document using a cognitive computing evaluation of the minimized electronic document based on a corpus of electronic documents, referred to as "reference" documents. The mechanisms of the illustrative embodiments utilize a cognitive question answering computing system, such as a multi-focus factoid deep question answering computing system, and a corpus of electronic documents to automatically minimize a given sensitive document to a point that the minimized or obfuscated entities are unlikely to be recoverable. An example of a multi-focus factoid deep question answering computing system is described in commonly assigned U.S. patent application Ser. Nos. 15/969,154; 16/168,718; and Ser. No. 16/182,877, which are hereby incorporated herein by reference. While example illustrative embodiments are described herein as being implemented with a multi-focus factoid deep question answering computing system, it should be appreciated that the present invention is not limited to such and any type of currently known or later developed cognitive question answering computing system, such as an IBM Watson™ question answering system available from International Business Machines Corporation of Armonk, New York, may be used without departing from the spirit and scope of the present invention.

With the mechanisms of the illustrative embodiments, given an entity whose identity is to be protected, each occurrence of this target entity is redacted, masked, or otherwise obfuscated in the given sensitive document to generate a "masked" document. The target entity is labeled as a focus for question answering purposes. The masked document is input to the multi-focus factoid deep question answering computing system which processes the masked document to attempt to fill in, or predict, the masked entity using a corpus of reference documents. If the target entity, also referred to as the "original" entity, is recoverable within a threshold level of confidence given the remaining unmasked content of the masked document, additional entities from the sensitive document are redacted, obfuscated, or otherwise masked to generate another masked version of the sensitive document which is then processed in a same manner, again with the original target entity as the focus for question answering. This process is repeated iteratively until the confidence value in the original entity recovery falls below the threshold confidence value or there are no entity instances in the sensitive document that may be redacted, obfuscated or masked.

Thus, through this automated and iterative cognitive process, using a cognitive question answering computing system, such as a multi focus factoid question answering computing system, as the mechanism for performing cognitive computing evaluation of the masked document, a sufficient level of redaction, obfuscation, or masking is achieved to ensure that the target entity is not recoverable from the masked document, while minimizing the amount of redaction, obfuscation, or masking to only the level necessary to ensure that the target entity cannot be recovered and no more. This allows operations that must operate on the masked document to be more likely to provide useful results as the masked document is not overly redacted, obfuscated, or masked such that it may be unusable.

To further illustrate the operation of the present invention in accordance with one illustrative embodiment, consider a scenario in which a hypothetical sensitive document is provided for purposes of a legal discovery process in a legal proceeding. The sensitive document is subject to a minimization or obfuscation process so as to remove instances of entities present in the sensitive document that are not pertinent to the legal discovery process. For example, assume that in this hypothetical case, misconduct of a fictional attorney, Rufus Xavier Sarsasparilla is the issue. Now, assume that in this scenario, the following passage appears in the sensitive document:

Rufus Xavier Sarsasparilla Esq. met with his client Thomas Underhill on May 27, 2007 in his new penthouse apartment in Tucson.

Because Mr. Sarsasparilla is the individual under investigation, and Mr. Underhill is not, it is important to protect Mr. Underhill's privacy before the sensitive document is made generally available. Therefore, Mr. Underhill's name is redacted, obfuscated, or masked with a replacement or filler string, such as an obviously fictitious name or placeholder, e.g., "John Doe" or "Focus1", such that the passage now reads:

Variation 1: Rufus Xavier Sarsasparilla Esq. met with his client FOCUS1 on May 27, 2007 in his new penthouse apartment in Tucson.

However, in this scenario, Mr. Underhill is a prominent public figure and is well known for having one of the few luxury penthouse apartments in Tucson. In fact, a set of passages from news articles from May 2007 make reference to this fact:

Thomas Underhill's penthouse apartment in Tucson is one of the largest and most expensive in the world Mr. Underhill's apartment was bought in May of 2007 for $10.5 million, making it the most expensive purchase on record in the city.

Millionaire Thomas Underhill was seen meeting with an unidentified man at his penthouse apartment early on the 27th.

Thus, even though Mr. Underhill's name was removed from the original sensitive document, an observant researcher, given the information in the other reference documents of a corpus as shown above, could draw some reasonable conclusions about the true identify of "FOCUS1", i.e. given these other passages, there is a high likelihood that FOCUS1 is referring to Thomas Underhill. This is problematic when the goal is to protect Mr. Underhill's identity and privacy.

The present invention assigns the role of "FOCUS" to the redacted and replaced name, and then attempts to find entities that fill this focus slot using a corpus of reference documents and the operation of the multi-focus factoid question answer computing system. If Mr. Underhill's name appears in the top n candidate answer slots, i.e. candidate answers having a confidence score equal to or higher than a predetermined threshold confidence score, then this indicates a need for more extensive minimization or obfuscation of the original sensitive document. Additional iterations of minimization or obfuscation may be performed, such as first identifying other proper nouns in the original sensitive document passage that can be minimized or obfuscated, and then identifying other noun phrases in the original sensitive document passage that can be minimized or obfuscated, etc. The minimization or obfuscation is performed iteratively until the confidence score for the correct answer, i.e. Thomas Underhill, falls below the predetermined threshold confidence score or out of the n top candidate answers.

For example, assume that the value for n is 10 and suppose that the name "Thomas Underhill" appears as the highest ranked candidate answer generated by the multi-focus factoid question answering system. There are two proper noun phrases in the original sensitive document passage that may be further minimized or obfuscated. For each proper noun phrase, a variation of the original passage in which different combinations of the proper noun phrases are minimized or obfuscated are generated and processed via the multi-focus factoid question answering computing system. For example, the following variations may be generated using the above example original passage:

Variation 2: Rufus Xavier Sarsasparilla Esq. met with his client FOCUS1 on FOCUS2 in his new penthouse apartment in Tucson.

Variation 3: Rufus Xavier Sarsasparilla Esq. met with his client FOCUS1 on May 27, 2007 in his new penthouse apartment in FOCUS2.

In both of variations 2 and 3 above, there are now two foci and the multi-focus factoid question answering computing system is used to attempt to fill in these foci. Suppose that in variation 2 above, Mr. Underhill's name appears as the fourth ranked candidate answer for FOCUS1, but for variation 3 above, Mr. Underhill's name appears as the $84^{th}$ ranked candidate answer. This indicates that variation 3 is an acceptable minimization or obfuscation of the original sensitive document passage. If neither variation is found acceptable, then the process may be repeated with 3 or more foci in an iterative manner until an acceptable level of minimization or obfuscation is achieved or until there are no other entities in the original sensitive document passage that can be minimized or obfuscated. In the event that all focus candidates are consumed and the correct answer, i.e. Thomas Underhill, still appears in the top n ranked candidate answers or has a confidence score equal to or higher than the threshold confidence score, the original sensitive document passage may be flagged for human intervention to determine how to minimize or obfuscate the passage. In some embodiments, in such cases, the entire passage may be redacted entirely from the original sensitive document.

It should be appreciated that the above example references iterations of the minimization or obfuscation process targeting proper nouns and noun phrases, however the present invention is not limited to such. Rather, depending on the desired implementation and configuration of the cognitive iterative minimization engine of the illustrative embodiments, other natural language elements of a natural language passage may be targeted for minimization or obfuscation, e.g., pronouns, prepositional phrases, etc. which are determined to be indicative of identity in particular sensitive contexts. In some embodiments, other types of text strings may also be targeted for minimization or obfuscation, e.g., medical codes in patient EMRs. Any portion of text that may be determined to be potential identifiable of an individual given a particular context may be considered a potential target for minimization or obfuscation as part of the iterative process of the present invention.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for identifying sensitive personally identifiable information (PII) present in the content of electronic documents, i.e. in passages within an electronic document, given a listing of entities or types of entities for which redaction, minimization, or obfuscation is to be performed. It will be assumed for purposes of the present description that the terms redaction, minimization, obfuscation, and anonymization are used interchangeably herein and refer to the removal of an original natural language text string from the content and the replacement of that original natural language text string with a placeholder that obfuscates the original natural language text string. Moreover, the present description will reference electronic "documents" as being the source of natural language textual content that is the subject of obfuscation of PII present in the content of such electronic "documents", however these electronic documents may be any portion of natural language text in which PII may be present, such as individual sentences, passages, paragraphs, sections of a document, or the entire document itself.

The mechanisms of the illustrative embodiments obfuscate mentions of protected entities present in the content of the electronic document and then generate questions for processing by a multi-focus factoid question answering (QA) system to determine if the identity of the protected entity may still be discerned from the content of the electronic document given information present in other reference documents of a corpus of reference documents. If the correct identity of the protected entity may still be identified even after obfuscation/minimization, then additional obfuscation/minimization may be performed iteratively until the correct identity of the protected entity can no longer be sufficiently identified, or until no further obfuscation/minimization is possible. If the correct identity of the protected entity cannot be sufficiently identified, then the level of obfuscation/minimization is sufficient to protect the identity of the protected entity.

FIG. 1 is an example block diagram illustrating the primary operational elements of an iterative personally identifiable information (PII) minimization engine in accordance with one illustrative embodiment. As shown in FIG. 1, a requesting computing system 110 may send a request for access to one or more electronic documents provided by an electronic document provider computing system 120. For example, the electronic document provider computing system 120 may be a computing system responsible for managing and maintaining a collection of electronic documents having natural language text passages which may include PII within the content of the natural language text passages. For example, the electronic document provider computing system 120 may be an electronic medical records storage computing system that is responsible for obtaining, managing, and maintaining electronic medical records for a plurality of patients, a governmental agency computing system, such as a court or other legal industry computing system which maintains electronic documents associated with legal proceedings, or any of a plethora of other types of computing systems which store electronic documents having natural language text passages with content that may include PII.

The requesting computing system 110 may send the request for access to the electronic document provider computing system 120, where the request specifies criteria for the document or document(s) that the requestor is interested in obtaining access to. For example, the requesting computing system 110 may seek patient electronic medical record information for developing a new medical computer application, treatment recommendation system, or the like, and may want to test the new medical computer application on actual patient data in the patient electronic medical record information. While it is important to provide actual data upon which the new medical computer application can be tested to ensure proper operation of the application, it is also important that the requestor not be provided with information that can personally identify a particular individual. It should be appreciated that this is only one example reason why a requestor may request access to one or more electronic documents which may include PII. The illustrative embodiments are not limited to any particular reason for the request for access to the electronic documents and any configuration or scenario in which electronic documents are maintained that may contain PII in their content and which need to have obfuscation, redaction, minimization, or anonymization of portions of the content to avoid identifying an individual, is intended to be within the spirit and scope of the present invention.

The PII which may be present in the content of the natural language text of the electronic documents may take many different forms including proper names, addresses, social security numbers, drivers license numbers, user identifiers, passwords, and the like. PII is any portion of information that either alone, or together with other portions of information, may be used to specifically identify a particular person, organization, or entity. In particular, in accordance with the illustrative embodiments, PII is any portion of information that can be used to specifically identify a particular entity whose identity is intended to be protected from discovery by unauthorized persons.

In response to the document provider computing system 120 receiving the request for access to electronic documents managed/maintained by the document provider computing system 120, the document provider computing system 120 may search their electronic documents storage for electronic documents matching any specified criteria in the received request and provide those electronic documents 130 to an iterative personally identifiable information (PII) minimization (IPIIM) engine 140 in accordance with one illustrative embodiment as part of, or before, granting access or otherwise releasing the requested electronic documents 130 to the requesting computing device 110. The IPIIM engine 140 may be part of the same computing system as the document provider computing system 120 or may be associated with a different computing system that may be provided by the same provider as the document provider, or as a third party service provider that provides an anonymization, redaction, minimization, or obfuscation service for document providers. In such a case, the sending of the documents 130 to the IPIIM engine 140 may utilize encryption/decryption mechanisms to ensure the privacy of the content in the documents 130.

As shown in FIG. 1, the IPIIM engine 140 includes a PII minimization engine 142, a query generator 144, a multi-focus factoid question answering (QA) system 146, and a PII minimization evaluation engine 148. The PII minimization engine 142 provides logic in either computer hardware, executed software, or a combination of computer hardware and executed software, for evaluating natural language content of a received document 130 to identify instances of mentions of protected entities 150 whose identities are to be obfuscated, obfuscation of one or more of these identified instances, and providing of the modified content to the query generator 144. The PII minimization engine 142 also provides logic for modifying an already modified portion of content, in a subsequent iteration, to further obfuscate portions of the content that may, together with content from reference documents in a reference document corpus 160, provide sufficient information as to identify a mentioned entity in the content.

That is, given a listing of protected entities 150, which may be provided by the document provider computing system 120 or another entity, such as a system administrator or the like, that is overseeing the minimization process. The listing of protected entities 150 may be specific entities, e.g., Thomas Underhill, or may be a type of entity, e.g., proper name of an individual, proper name of an organization, or the like. In the case where a type of entity is specified, then during natural language processing of the document 130 to identify instances of mentions of protected entities, types may be matched between the protected entities 150 and types of mentions within the content. A variety of techniques may be utilized to identify instances of protected entities in natural language content. In some illustrative embodiments, a named entity consists of an equivalence class of string representations that can represent this named entity, e.g., ["Dwight Eisenhower", "Dwight David Eisenhower", "Dwight D. Eisenhower", "DDE", . . . ] such that any instances of any of these named entities strings may be identified in the natural language content through natural language processing and parsing of the natural language content. In another illustrative embodiment, a string edit-distance metric may be used to identify close matches, e.g., "Dwight D. Eisenhower" is string edit-distance similar to "Dwight Eisenhower" and instances of either of these strings in the natural language content may be identified through natural language processing and parsing of the natural language content.

It should be noted that while the present description will focus on a single electronic document 130 being processed via the IPIIM engine 140 for ease of explanation, the operations described herein may be applied to multiple electronic documents to minimize PII in each electronic document 130 prior to granting access or otherwise releasing the electronic document 130 to the requesting computing device 110. Moreover, as noted above, the electronic document 130 may be an individual portion of text, a passage, or the entire electronic document. In a case where the electronic document 130 comprises multiple passages or portions of text, the operations of the illustrative embodiments may be applied to each portion of text or passage within the electronic document 130.

The query generator 144 provides logic in either computer hardware, executed software, or a combination of computer hardware and executed software, for generating one or more queries based on the modified content of the electronic document 130. For example, given the passage "Rufus Xavier Sarsasparilla Esq. met with his client Thomas Underhill on May 27, 2007 in his new penthouse apartment in Tucson" and a need to obfuscate the instance of the name "Thomas Underhill", the PII minimization engine 142 may modify the content of the passage to be "Rufus Xavier Sarsasparilla Esq. met with his client FOCUS1 on May 27, 2007 in his new penthouse apartment in Tucson." From this modified version of the original content, the query generator 144 may generate a query of the type "Who met with Rufus Xavier Sarsasparilla Esq. on May 27, 2007 in his new penthouse apartment in Tucson?" The query or queries generated by the query generator 144 based on the modified version of the content in which PII instances are obfuscated and replaced by placeholders, e.g., FOCUS1, are provided as input to the multi-focus factoid QA system 146.

The multi-focus factoid QA system 146 processes the queries provided by the query generator 144 based on the reference document corpus 160 to determine if the correct identity of a protected entity 150 corresponding to a placeholder, e.g., FOCUS1, in the modified content may be determined with sufficient confidence. That is, the multi-focus factoid QA system 146 processes the query or queries and generates one or more candidate answers indicating the multi-focus factoid QA system 146 determined prediction of the identity of the obfuscated protected entity 150, e.g., FOCUS1. The candidate answer(s) include a confidence score indicating a level of confidence the multi-focus factoid QA system 146 has in the candidate answer being a correct answer, i.e. a correct identity of the obfuscated protected entity 150.

The listing of candidate answers and confidence scores are provided to the PII minimization evaluation engine 148 which evaluates the listing of candidate answers and confidence scores versus the protected entity 150 that is obfuscated in the original content, i.e. the correct identity for FOCUS1, and a threshold confidence score. That is, the PII minimization evaluation engine 148 evaluates the candidate answers with regard to their confidence scores to identify a subset of candidate answers that have confidence scores that are equal to or greater than the threshold confidence score. The candidate answers in the subset are compared against the correct identity for the placeholder for the protected entity 150, e.g., FOCUS1, to determine if the correct identity appears in the subset of candidate answers. If not, then the current obfuscated or minimized version of the content of the document 130 is sufficient to protect the identity of the protected entity. In such a situation, the current obfuscated or minimized version of the document 130 is output as a PII minimized document 170 to the requesting computing device 110.

If the correct identity appears in the subset of candidate answers, then the obfuscation or minimization is insufficient to protect the identity of the protected entity 150. In such a situation, then the current obfuscated or minimized version of the content is submitted to the PII minimization engine 142 for further obfuscation or minimization of PII present in the current obfuscated or minimized version of the content. Thus, for example, additional nouns and/or noun phrases present in the content may be identified and obfuscated or minimized by redaction and replacement with a placeholder, e.g., FOCUS2, FOCUS3, etc. The new version of the obfuscated or minimized version of the content is then passed through the processing by the query generator 144, multi-focus factoid QA system 146, and PII minimization evaluation engine 148 as a subsequent iteration.

This process may be repeated iteratively with increasing amounts of obfuscation/minimization of PII in the content of the document 130. This iterative process continues until either the PII minimization evaluation engine 148 determines that the correct identity of the protected entity 150 does not appear in the subset of candidate answers generated by the multi-focus factoid QA system 146 which have a confidence score above the predetermined confidence score threshold, or there are no additional instances of PII in the content that can be obfuscated/minimized. In the case where the PII minimization evaluation engine 148 determines that the correct identity does not appear in the candidate answers with sufficient level of confidence, i.e. confidence score equal to or above the predetermined confidence score threshold, the current version of the content may be output as part of the obfuscated/minimized document 170 to the requesting computing device 110. In the case where there are no additional instances of PII in the content that can be obfuscated/minimized, the entire content may be obfuscated/minimized so as to protect the protected entity 150 identity prior to providing access or releasing the document as an obfuscated/minimized document 170. Alternatively, the document 130 may not be included in the obfuscated document 170 set that is provided to the requesting computing device 110. In some cases, an administrator of the document provider computing system 120 may be notified of the inability to sufficiently obfuscate/minimize the document so that the human administrator may perform manual obfuscation/minimization of the document prior to granting access or releasing the manually obfuscated/minimized version of the document to the requesting computing device 110.

Thus, the mechanisms of the illustrative embodiments provide an automated iterative approach to determining a level of obfuscation/minimization of PII needed to ensure that a protected entity's identity is not discoverable from the content of an electronic document. The mechanisms of the illustrative embodiments utilize a multi-focus factoid question answering (QA) system to attempt to discern the identity of an obfuscated/minimized instance of a mention of a protected entity in the content. The candidate answers that this QA system generates are evaluated to determine whether the QA system was able to discern the correct identity with at least a predetermined threshold amount of confidence. If so, additional portions of the content are obfuscated/minimized and the process is performed again in an iterative fashion until the correct answer cannot be discerned by the QA system with the predetermined threshold amount of confidence. As a result, obfuscated/minimized electronic document content is generated that is relatively safer to allow access to or to release to requestors, when compared to accessing/releasing the original electronic document content, without a significant concern that the privacy of protected entities will be inadvertently violated.

The illustrative embodiments provide an improved computer tool for automatically obfuscating/minimizing PII in content of electronic documents. The improved computer tool may be implemented in any suitable computing system comprising one or more computing devices. The improved computer tool may be part of a computing system that manages/maintains electronic documents, controls access to electronic documents, distributes electronic documents, or otherwise is involved in providing electronic documents for access by other parties via one or more data networks and/or computing systems. In other illustrative embodiments, the improved computer tool may be provided as a third party service provider that provides the automated iterative minimization/obfuscation process of the illustrative embodiments as a service accessed by a provider of electronic documents.

Figure 2:
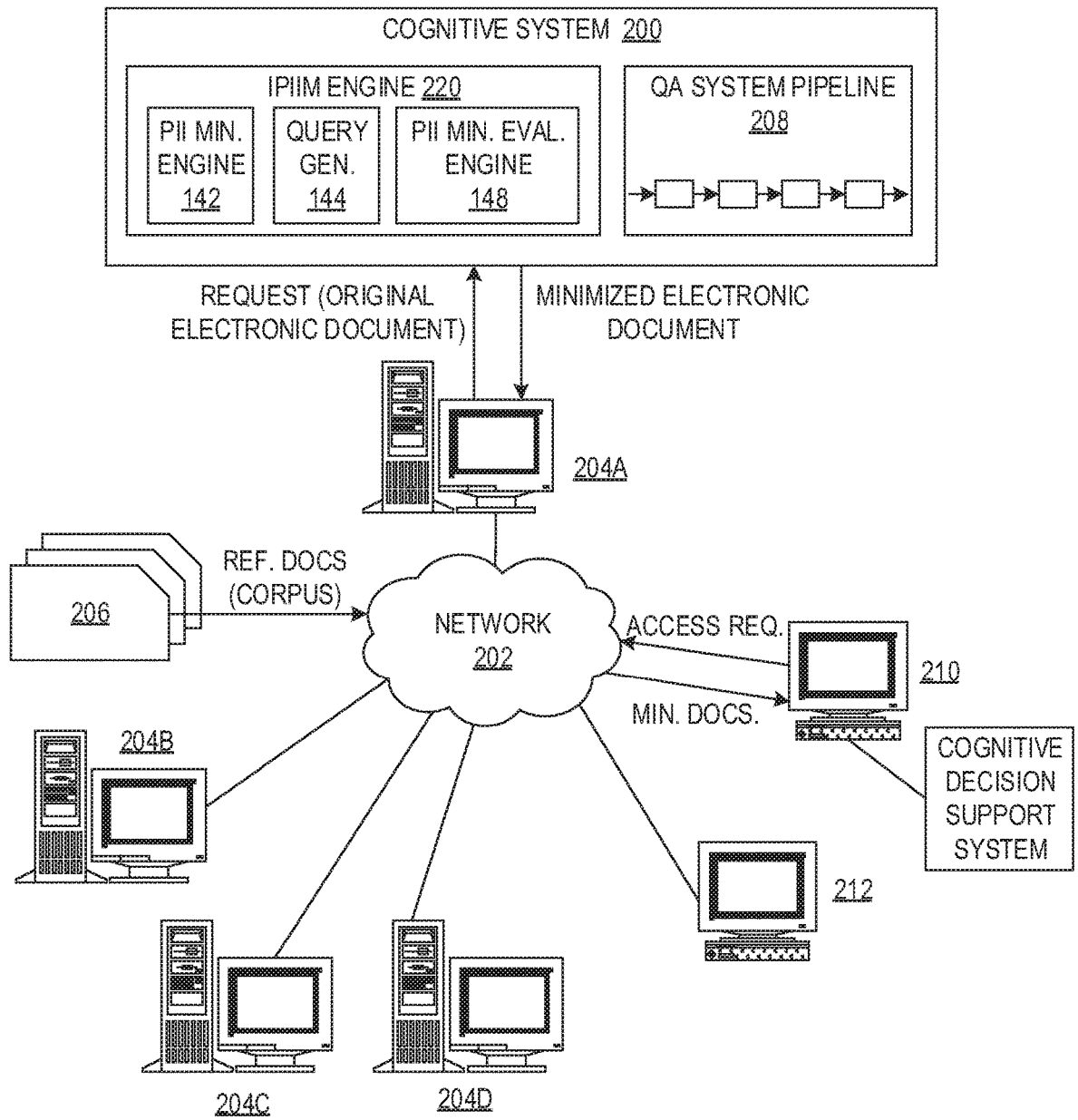
FIG. 2 depicts a schematic diagram of an example data processing system in a computer network in which aspects of the illustrative embodiments may be implemented.

Thus, the illustrative embodiments may be utilized in many different types of data processing environments. In order to provide a context for the description of the specific elements and functionality of the illustrative embodiments, FIGS. 1-2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

In some illustrative embodiments, the mechanisms of the illustrative embodiments operate in conjunction with an electronic document provider computing system, such as an electronic medical record (EMR) database system, governmental organization computing system, or any other provider of electronic documents. Such computer systems are only examples to illustrate a type of system which may handle sensitive personally identifiable information (PII) that may be used to uniquely identify an individual. The illustrative embodiments may be used with any system in which potentially sensitive PII may be handled by the system. Such systems may include cognitive systems, such as patient treatment recommendation systems, decision support systems, or the like.

One of the primary operational components of the iterative PII minimization (IPIIM) engine 140 is the multi-focus factoid question answer (QA) system 146, which is a type of cognitive computing system (or simply cognitive system), i.e. a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like. In particular, the illustrative embodiments utilize the cognitive computing system to perform question answering cognitive operations to attempt to discern the identity of a protected entity whose mention in the content of an electronic document has been obfuscated/minimized.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding
Ingest and process vast amounts of structured and unstructured data
Generate and evaluate hypothesis
Weigh and evaluate responses that are based only on relevant evidence
Provide situation-specific advice, insights, and guidance
Improve knowledge and learn with each iteration and interaction through machine learning processes
Enable decision making at the point of impact (contextual guidance)
Scale in proportion to the task
Extend and magnify human expertise and cognition
Identify resonating, human-like attributes and traits from natural language
Deduce various language specific or agnostic attributes from natural language
High degree of relevant recollection from data points (images, text, voice) (memorization and recall)
Predict and sense with situational awareness that mimic human cognition based on experiences
Answer questions based on natural language and specific evidence In one aspect according to the illustrative embodiments, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledge-base) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

The QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence, i.e. a confidence score, that indicates the amount of confidence the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

In particular, the QA pipeline of the illustrative embodiments is used to predict the identity of a obfuscated/minimized mention of a protected entity based on information obtained from a reference document corpus 160. Thus, the QA pipeline looks to the reference document corpus 160 as evidence for answering queries generated by the QA pipeline which then together may be used to predict the identity of an obfuscated/minimized mention of a protected entity in content of an electronic document and generate confidence scores for such predictions. The resulting ranked listing of candidate answers, ranked according to confidence scores, may then be evaluated to determine if the level of obfuscation/minimization is sufficient to protect the identity of the protected entity. The QA pipeline may be part of the IPIIM engine or may be provided as part of a separate computing system with which the IPIIM engine communicates to obtain the ranked listing of candidate answers based on a submitted query generated by the IPIIM engine.

FIG. 2 depicts a schematic diagram of one illustrative embodiment of a cognitive system 200, which in the illustrative embodiments is a cognitive system implementing an iterative personally identifiable information minimization (IPIIM) engine 220 comprising a request processing pipeline 208, which in some embodiments may be a question answering (QA) pipeline, in a computer network 202. The QA pipeline 208 operates on structured and/or unstructured requests in the form of input questions but may also operate on requests that are posed as natural language requests that may not be in the form of a question. One example of a question processing operation which may be used in conjunction with the principles described herein is described in U.S. Patent Application Publication No. 2011/0125734, which is herein incorporated by reference in its entirety. The cognitive system 200 is implemented on one or more computing devices 204A-D (comprising one or more processors and one or more memories, and potentially any other computing device elements generally known in the art including buses, storage devices, communication interfaces, and the like) connected to the computer network 202. For purposes of illustration only, FIG. 2 depicts the cognitive system 200 being implemented on computing device 204A only, but as noted above the cognitive system 200 may be distributed across multiple computing devices, such as a plurality of computing devices 204A-D. The network 202 includes multiple computing devices 204A-D, which may operate as server computing devices, and 210-212 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 200 and network 202 enables question processing and answer generation (QA) functionality for one or more cognitive system users via their respective computing devices 210-212. In other embodiments, the cognitive system 200 and network 202 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 200 may be used with components, systems, sub-systems, and/or devices other than those that are depicted herein.

The cognitive system 200 is configured to implement a request processing pipeline 108 that receive inputs from various sources. The requests may be posed in the form of a natural language question, natural language request for information, natural language request for the performance of a cognitive operation, or the like. For example, the cognitive system 200 receives input from the network 202, a corpus or corpora of electronic documents 206, cognitive system users, and/or other data and other possible sources of input. In one embodiment, some or all of the inputs to the cognitive system 200 are routed through the network 202. The various computing devices 204A-D on the network 202 include access points for content creators and cognitive system users. Some of the computing devices 204A-D include devices for a database storing the corpus or corpora of data 206 (which is shown as a separate entity in FIG. 2 for illustrative purposes only). Portions of the corpus or corpora of data 206 may also be provided on one or more other network attached storage devices, in one or more databases, or other computing devices not explicitly shown in FIG. 2. The network 202 includes local network connections and remote connections in various embodiments, such that the cognitive system 200 may operate in environments of any size, including local and global, e.g., the Internet.

In one embodiment, the content creator creates content in a document of the corpus or corpora of data 206 for use as part of a corpus of data with the cognitive system 200. The document includes any file, text, article, or source of data for use in the cognitive system 200. The IPIIM engine 220 of the cognitive system 200 receives electronic documents for automated obfuscation/minimization of PII via a network connection or an Internet connection to the network 202, and operates on these electronic documents to perform the iterative obfuscation/minimization operation described previously with regard to one or more illustrative embodiments, which includes submitting queries to the multi-focus factoid QA pipeline 208 which answers/processes the queries based on the content in the corpus or corpora of data 206 to generate a listing of candidate answers and confidence scores as predictions of the identity of an obfuscated/minimized protected entity mention in the content of the electronic document.

In one embodiment, the questions/requests are formed using natural language. The IPIIM engine 220 of the cognitive system 200 parses and interprets the question/request via the QA pipeline 208, and generates one or more candidate answers to the queries generated by the IPIIM engine 220. The IPIIM engine 220 of the cognitive system 200 generates either an obfuscated/minimized version of the received electronic document for granting access/releasing to requestor computing device(s), or provides a notification to the electronic document provider of an inability to sufficiently obfuscate/minimize PII in the content of the electronic document so that the provider may determine how to manually obfuscate/minimize the PII in the content of the electronic document and/or remove the electronic document from potential access/release to requestors.

The IPIIM engine 220 of the cognitive system 200 implements the pipeline 208 which comprises a plurality of stages for processing an input question/request based on information obtained from the corpus or corpora of data 206. The pipeline 208 generates answers/responses for the input question or request based on the processing of the input question/request and the corpus or corpora of data 206. The pipeline 208 will be described in greater detail hereafter with regard to FIG. 4.

In some illustrative embodiments, the cognitive system 200 may be the IBM Watson™ cognitive system available from International Business Machines Corporation of Armonk, New York, which is augmented with the mechanisms of the illustrative embodiments described herein with regard to the IPIIM engine 220. As outlined previously, a pipeline of the IBM Watson™ cognitive system receives an input question or request, such as from the query generator 144 of the IPIIM engine 140 or 220, which it then parses to extract the major features of the question/request, which in turn are then used to formulate queries that are applied to the corpus or corpora of data 206. Based on the application of the queries to the corpus or corpora of data 206, a set of hypotheses, or candidate answers/responses to the input question/request, are generated by looking across the corpus or corpora of data 206 for portions of the corpus or corpora of data 206 (hereafter referred to simply as the corpus 206) that have some potential for containing a valuable response to the input question/response (hereafter assumed to be an input question). The pipeline 208 of the IBM Watson™ cognitive system then performs deep analysis on the language of the input question and the language used in each of the portions of the corpus 206 found during the application of the queries using a variety of reasoning algorithms.

The scores obtained from the various reasoning algorithms are then weighted against a statistical model that summarizes a level of confidence, or confidence score, that the pipeline 208 of the IBM Watson™ cognitive system 100, in this example, has regarding the evidence that the potential candidate answer is inferred by the question. This process is repeated for each of the candidate answers to generate a ranked listing of candidate answers, ranked according to confidence scores, which may then be presented to the source of input question, e.g., the IPIIM engine 220. More information about the pipeline 208 of the IBM Watson™ cognitive system 200 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the QA pipeline 208 from the IPIIM engine 220 may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. In particular, the QA pipeline 208 receives a query from the query generator 144 of the IPIIM engine 140 or 220, processes the query using reference document corpus 160 or 206, and generates a listing of candidate answers representing predictions of the identity of an obfuscated/minimized mention of a protected entity, e.g., FOCUS1 in the above examples, ranked according to confidence scores. This ranked listing of candidate answers is provided to the PII minimization evaluation engine 148 of the IPIIM 140 or 220 which evaluates whether or not the obfuscation/minimization performed by the PII minimization engine 142 of the IPIIM 140 or 220 is sufficient to protect the identity of the protected entity. That is, the PII minimization evaluation engine 148 determines whether the correct identity of the protected entity is present within the listing of candidate answers with a sufficiently high enough level of confidence, i.e. a confidence score equal to or higher than a predetermined threshold confidence score. The process may then be iteratively performed with increasing levels of obfuscation/minimization as previously mentioned above.

Thus, using the example architecture shown in FIG. 2, and the previous scenario mentioned above with regard to the fictional individual Thomas Underhill, consider again the scenario in which the hypothetical sensitive document is provided for purposes of a legal discovery process in a legal and is subject to a minimization or obfuscation process so as to remove instances of protected entities present in the sensitive document that are not pertinent to the legal discovery process. For example, a user of a client computing device 210 may wish to gain access to an electronic document provided by an electronic document provider computing system, such as server 204D for example. In response to receiving the request from the client computing device 210, the server 204D may engage the services of the cognitive system 200, and specifically the IPIIM engine 220 of the cognitive system 200, to obfuscate/minimize the content of the electronic document prior to providing access to the electronic document or releasing the electronic document to the client computing device 210. The IPIIM engine 220 may receive the electronic document, e.g., 130 in FIG. 1, and a listing of one or more protected entities, e.g., 150 in FIG. 1, and may perform natural language processing on the electronic document to identify instances of mentions of the protected entities, e.g., Thomas Underhill in the above example, which are then obfuscated/minimized and replaced with placeholders, e.g., FOCUS1 in the above example.

The IPIIM engine 220 may then generate one or more queries based on the obfuscated/minimized content which are then submitted to the multi-focus factoid QA system, e.g., QA pipeline 208, for generation of predictions of the identity of the obfuscated/minimized mentions of the protected entities. The IPIIM engine 220 evaluate the predictions to determine fi the content of the electronic document has been sufficiently obfuscated/minimized to protect the identity of the protected entities. If so, the current version of the obfuscated/minimized electronic document may be provided to the requestor computing device, e.g., client device 210. If the current version is not sufficient obfuscated/minimized, then a subsequent iteration of obfuscation/minimization is performed as discussed previously until either a sufficient level of obfuscation/minimization is achieved, or no further elements of the content of the electronic document are available for obfuscation/minimization at which point a notification may be sent to a provider of the electronic document.

Figure 3:
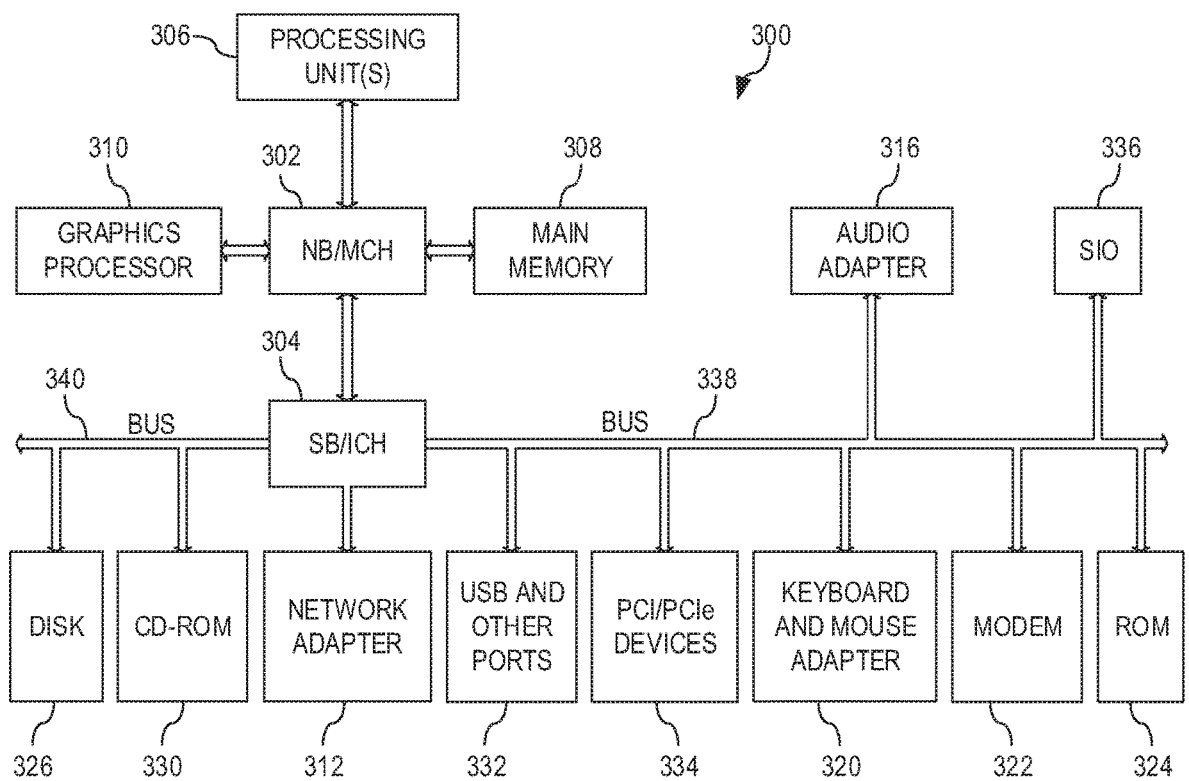
FIG. 3 is a block diagram of an example data processing system in which aspects of the illustrative embodiments are implemented.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 3 is provided as an example of one type of data processing system in which aspects of the present invention may be implemented. Many other types of data processing systems may be likewise configured to specifically implement the mechanisms of the illustrative embodiments.

FIG. 3 is a block diagram of an example data processing system in which aspects of the illustrative embodiments are implemented. Data processing system 300 is an example of a computer, such as server 204 or client 210 in FIG. 2, in which computer usable code or instructions implementing the processes for illustrative embodiments of the present invention are located. In one illustrative embodiment, FIG. 3 represents a server computing device, such as a server 204, which implements a cognitive system 200 and QA system pipeline 208 augmented to include the additional mechanisms of the illustrative embodiments, e.g., the IPIIM engine 140 or 220, as described herein.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 is connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 is connected to SB/ICH 304.

An operating system runs on processing unit 306. The operating system coordinates and provides control of various components within the data processing system 300 in FIG. 3. As a client, the operating system is a commercially available operating system such as Microsoft® Windows 10°. An object-oriented programming system, such as the Java™ programming system, may run in conjunction with the operating system and provides calls to the operating system from Java programs or applications executing on data processing system 300.

As a server, data processing system 300 may be, for example, an IBM® eServer™ System P® computer system, running the Advanced Interactive Executive (AIX®) operating system or the LINTJX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and are loaded into main memory 308 for execution by processing unit 306. The processes for illustrative embodiments of the present invention are performed by processing unit 306 using computer usable program code, which is located in a memory such as, for example, main memory 308, ROM 324, or in one or more peripheral devices 326 and 330, for example.

A bus system, such as bus 338 or bus 340 as shown in FIG. 3, is comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, includes one or more devices used to transmit and receive data. A memory may be, for example, main memory 308, ROM 324, or a cache such as found in NB/MCH 302 in FIG. 3.

Those of ordinary skill in the art will appreciate that the hardware depicted in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Figure 4:
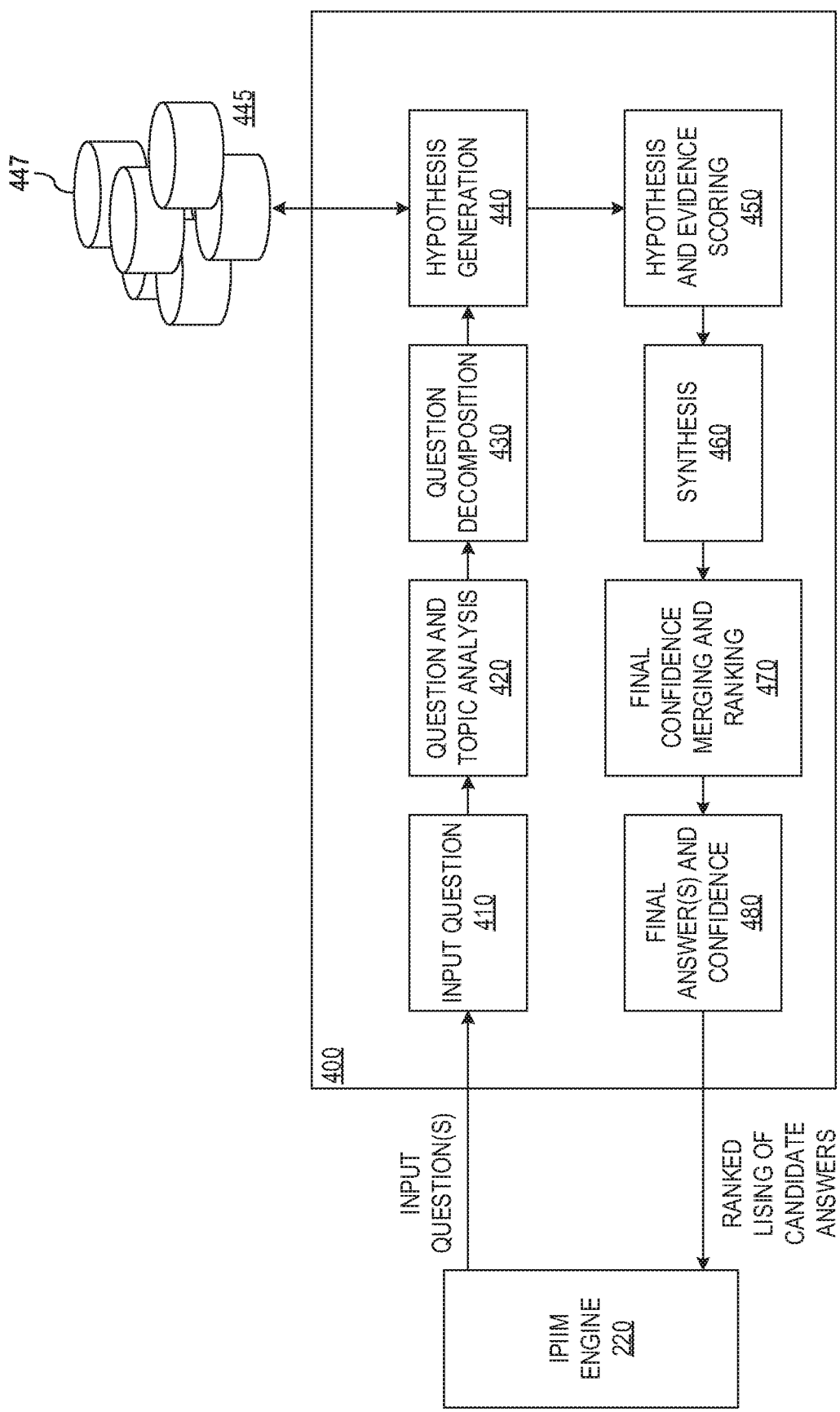
FIG. 4 is an example diagram of a question answering pipeline in accordance with one illustrative embodiment.

FIG. 4 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 4 is provided only as one example of the processing structure that may be implemented to process a natural language input requesting the operation of a cognitive system to present a response or result to the natural language input.

The QA system pipeline of FIG. 4 may be implemented, for example, as QA pipeline 208 of cognitive system 200 in FIG. 2. It should be appreciated that the stages of the QA pipeline shown in FIG. 4 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 4, in accordance with one illustrative embodiment of the present invention, may receive questions or requests from a query generator of the IPIIM engine 140 or 220, for example. The QA pipeline of FIG. 4 may operate on such queries to generate candidate answers and confidence scores that represent predictions of the identity of a protected entity based on an obfuscated/minimized mention of the protected entity in content of an electronic document from which the input questions or requests are generated.

As shown in FIG. 4, the QA pipeline 400 comprises a plurality of stages 410-480 through which the cognitive system operates to analyze an input question and generate a final response. In an initial question input stage 410, the QA pipeline 400 receives an input question that is presented in a natural language format. That is an input question for which an answer is to be obtained may be received, via an input interface, e.g., a question of "Who are Washington's closest advisors?" In response to receiving the input question, the next stage of the QA pipeline 300, i.e. the question and topic analysis stage 420, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic. A similar parsing and extraction of major features may be performed with regard to obfuscated/minimized questions, such as the example question mentioned in the example scenario above, i.e. "Who met with Rufus Xavier Sarsaparilla Esq. on May 27, 2007 in his new penthouse apartment in Tucson?"

The extracted major features include key words and phrases classified into question characteristics, such as the focus of the question, the lexical answer type (LAT) of the question, and the like. The focus of the question may also be specifically identified by a placeholder, such as "FOCUS1", generated by the obfuscation/minimization of the illustrative embodiments. The focus is a noun of the question that ideally should also be present in the answer sentence. Thus, for example, if an answer sentence found in a corpus includes the statement that "Thomas Underhill met with his attorney at his apartment in Tucson today", then Thomas Underhill may be considered to be likely FOCUS1 as the name would appear in both the input question and the answer sentence, thereby providing a candidate answer of "Thomas Underhill".

The lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 4, the identified major features are then used during the question decomposition stage 430 to decompose the question into one or more queries that are applied to the corpora of data/information 445 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 445. That is, these various sources themselves, different collections of sources, and the like, represent a different corpus 447 within the corpora 445. There may be different corpora 447 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 447 within the corpora 445.

The queries are applied to one or more databases storing information about the electronic texts, documents, articles, websites, and the like, that make up the corpus of data/information, e.g., the corpus of data 206 in FIG. 2. The queries are applied to the corpus of data/information at the hypothesis generation stage 440 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 440, to generate hypotheses for answering the input question. These hypotheses are also referred to herein as "candidate answers" for the input question. For any input question, at this stage 440, there may be hundreds of hypotheses or candidate answers generated that may need to be evaluated.

The QA pipeline 400, in stage 450, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis, or confidence score. There are various ways for these reasoning algorithms to generate their scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 460, the large number of scores generated by the various reasoning algorithms are synthesized into confidence scores or confidence measures for the various hypotheses. This process involves applying weights to the various scores, where the weights have been determined through training of the statistical model employed by the QA pipeline 400 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 400 that identifies a manner by which these scores may be combined to generate a confidence score or measure for the individual hypotheses or candidate answers. This confidence score or measure summarizes the level of confidence that the QA pipeline 400 has about the evidence that the candidate answer is inferred by the input question, i.e. that the candidate answer is the correct answer for the input question.

The resulting confidence scores or measures are processed by a final confidence merging and ranking stage 470 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 480, a final answer and confidence score, or final set of candidate answers and confidence scores, may be generated and output to the submitter of the original input question via a graphical user interface or other mechanism for outputting information.

In particular, with regard to the illustrative embodiments, stage 480 may output a ranked listing of candidate answers that represent predictions of the identity of an obfuscated/minimized mention of a protected entity. The ranked listing of candidate answers includes the answer text itself as well as the corresponding confidence score. The ranked listing of candidate answers may be output to the PII minimization evaluation engine 148 to determine whether the ranked listing of candidate answers includes the correct identity of the protected entity with a sufficiently high confidence score, i.e. equal to or above a threshold confidence score. This indicates that the obfuscation/minimization was insufficient to protect the identity of the protected entity given information present in other reference documents in the corpus. If the ranked listing of candidate answers does not include the correct identity of the protected entity with a sufficient level of confidence, then the obfuscation/minimization is sufficient to protect the identity of the protected entity and the current obfuscated/minimized version of the original content of the electronic document is able to be accessed/released to a requestor computing device without compromising the privacy of the protected entity.

Figure 5:
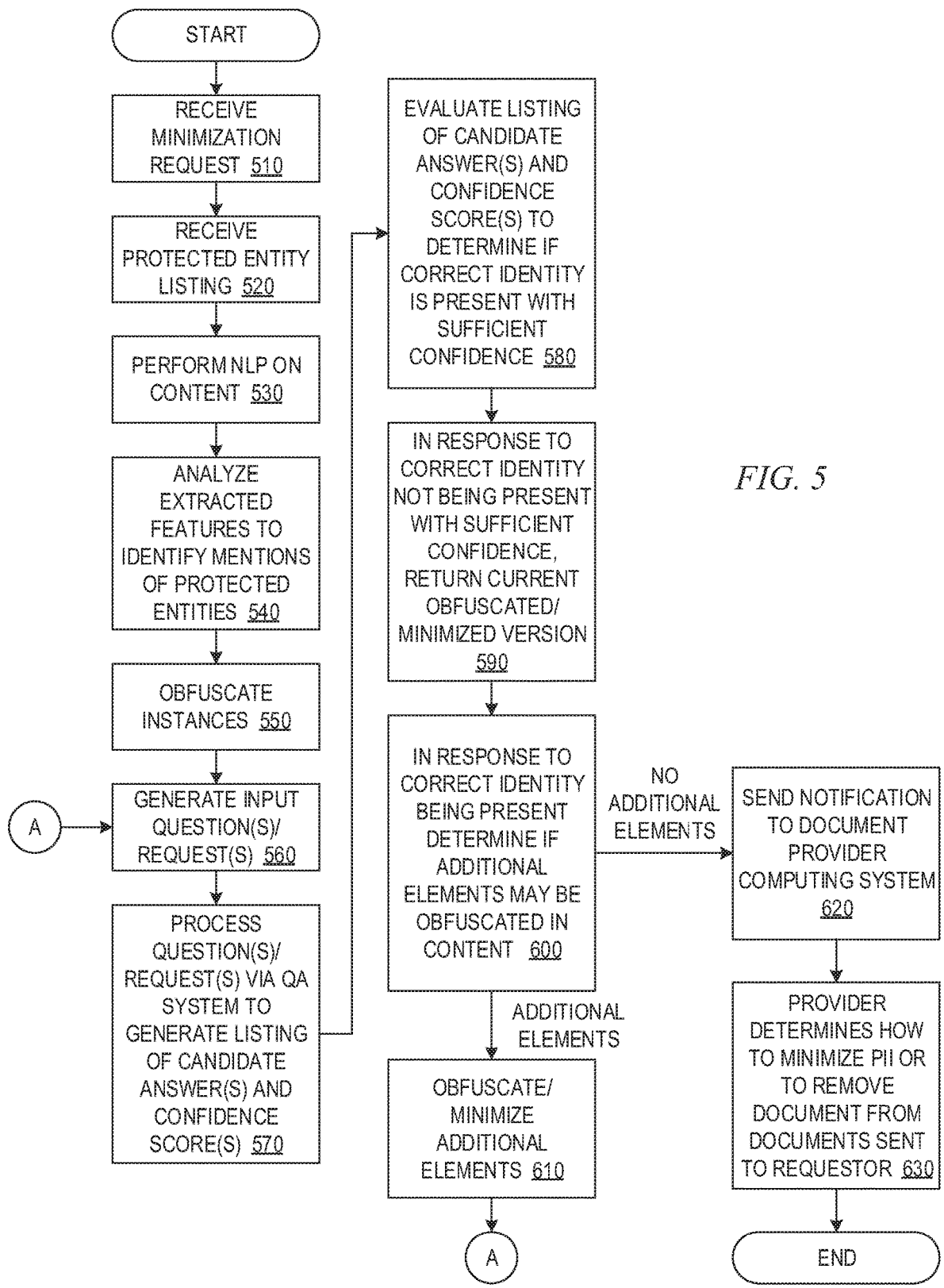
FIG. 5 is a flowchart outlining an example operation of an iterative personally identifiable information minimization (IPIIM) engine in accordance with one illustrative embodiment.

FIG. 5 is a flowchart outlining an example operation of an iterative personally identifiable information minimization (IPIIM) engine in accordance with one illustrative embodiment. As shown in FIG. 5, the operation starts with a request being received by the IPIIM engine to minimize PII in the content of a specified electronic document (step 510). The IPIIM engine also receives a listing of one or more protected entities whose identities are to be protected through obfuscation/minimization of PII in the content of electronic documents (step 520). The content of the specified electronic document is processed via natural language processing to extract major features (step 530) which are then analyzed by the IPIIM engine to identify one or more instances of mentions of a protected entity (step 540). The instances of mentions of the protected entity are obfuscated or minimized by redaction and replacement with placeholders that mask the identity of the protected entity (step 550).

The obfuscated/minimized content is then used to generate one or more input questions or requests that are input to a multi-focus factoid question answering (QA) system (step 560). The QA system operates on the input question, based on one or more reference document corpora, to generate a listing of one or more candidate answers and corresponding confidence scores indicating predictions of the identity of the protected entity corresponding to the obfuscated/minimized mentions in the content of the electronic document (step 570). The listing of candidate answer(s) and corresponding confidence scores are evaluated to determine if the correct identity of a protected entity corresponding to the obfuscated/minimized mention in the content of the electronic document is present in the listing of candidate answers with sufficient confidence score, i.e. equal to or above a threshold confidence score (step 580).

In response to the correct identity of the protected entity not being present in the listing of candidate answers with a sufficient level of confidence, the obfuscated/minimized version of the content is returned as a version of the content that may be accessed or released to the requestor computing system (step 590). In response to the correct identity of the protected entity being present in the listing of candidate answers with sufficient level of confidence, a determination is made as to whether additional elements of the content may be obfuscated/minimized (step 600). If so, one or more additional elements of the content are obfuscated/minimized, e.g., nouns or noun phrases (step 610), and the operation returns to step 560 for a subsequent iteration to be performed. If there are no additional elements of the content that can be obfuscated/minimized, the operation sends a notification to the electronic document provider (step 620) who can then determine how to minimize PII in the content of the electronic document and/or remove the entirety of the document from documents returned to the requestor (step 630). The operation then terminates.

As mentioned above, the sufficiently obfuscated/minimized content version of original electronic document may be released to, or accessed by, a requestor computing device. In some illustrative embodiments, the obfuscated/minimized content version of the original electronic document may be stored in an obfuscated/minimized electronic document storage for later access by the requestor computing device and/or other requestor computing devices. The requestor computing device may then perform any desired operation on the obfuscated/minimized electronic document without exposing the identity of the protected entities. In one illustrative embodiment, the requestor computing device may perform an application development operation for developing an application or for performing a debugging operation for debugging an application that operates on the electronic document.

In some illustrative embodiments, the requestor computing device may implement its own cognitive computing system and may perform cognitive computing operations on the obfuscated/minimized electronic document. For example, the requestor computing device may implement a cognitive decision support system to perform operations for generating a decision support output based on the processing of electronic documents and, in accordance with the illustrative embodiments, such electronic documents may be obfuscated/minimized by the mechanisms of the illustrative embodiments. The requestor computing device may further perform, in an application development environment, an application development operation for developing an application of the cognitive decision support system based on processing of the obfuscated/minimized content of the electronic document by the cognitive decision support system, without exposing the identity of the protected entity to the application development environment.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to minimize personally identifiable information (PII) in an electronic document, the method comprising:

receiving, by an iterative personally identifiable information minimization (IPIIM) engine executing in the data processing system, the electronic document comprising natural language content having a mention of a protected entity;

applying, by the IPIIM engine, natural language processing and analytic analysis on the natural language content to obfuscate the mention of the protected entity and thereby generate a first minimized natural language content, wherein the obfuscated mention of the protected entity is indicated to be a focus in the first minimized natural language content;

automatically processing, by a question answering computing system, the first minimized natural language content, as input to the question answering computing system, to generate a first listing of one or more candidate answers and corresponding confidence scores, wherein the one or more candidate answers specify predictions of the protected entity, in the mention of the protected entity, prior to the obfuscation of the mention of the protected entity, and wherein the question answering computing system comprises artificial intelligence computer logic configured to predict an answer corresponding to the focus of the input to the question answering computing system;

determining, by the IPIIM engine, whether or not the first minimized natural language content is sufficiently obfuscated based on the first listing of one or more candidate answers and corresponding confidence scores, wherein the first minimized natural language content is determined to not be sufficiently obfuscated in response to a correct identity of the protected entity being present in a candidate answer, of the one or more candidate answers, which has a corresponding confidence score equal to or above a predetermined threshold confidence score; and in response to determining that the first minimized natural language content is sufficiently obfuscated, providing the first minimized natural language content as a final minimized natural language content of the electronic document for processing by a requestor computing device.

2. The method of claim 1, further comprising, in response to determining that the first minimized natural language content is not sufficiently obfuscated, iteratively performing additional minimizations of elements present in the natural language content to increase obfuscation/minimization of elements in the natural language content until a sufficient level of obfuscation is achieved to cause the question answering system to not include the correct identity of the protected entity in the first listing of one or more candidate answers with a corresponding confidence score equal to or higher than a predetermined threshold confidence score.

3. The method of claim 1, further comprising, in response to determining that the first minimized natural language content is not sufficiently obfuscated:

automatically performing obfuscation of one or more additional elements of the first minimized natural language content to generate second minimized natural language content, wherein the obfuscation of the one or more additional elements comprises designating each of the one or more additional elements as foci for answer generation by the question answering computing system;

processing, by the question answering computing system, the second minimized natural language content to generate a second listing of one or more candidate answers and corresponding confidence scores;

determining, by the IPIIM engine, whether or not the second minimized natural language content is sufficiently obfuscated based on the second listing of one or more candidate answers and corresponding confidence scores; and in response to determining that the second minimized natural language content is sufficiently obfuscated, providing the second minimized natural language content as a final minimized natural language content of the electronic document for processing by the requestor computing device.

4. The method of claim 1, further comprising receiving a listing of protected entities whose identities are to be protected in content of electronic documents, wherein applying, by the IPIIM engine, natural language processing and analytic analysis on the natural language content to obfuscate the mention of the protected entity and thereby generate the first minimized natural language content comprises identifying mentions in the natural language content that match an entity in the listing of protected entities.

5. The method of claim 1, wherein processing, by the question answering computing system, the first minimized natural language content to generate the first listing of one or more candidate answers and corresponding confidence scores comprises:

generating a first input question based on the first minimized natural language content; and processing the first input question by the question answering computing system at least by applying one or more queries to a reference document corpus to generate the first listing of one or more candidate answers.

6. The method of claim 1, wherein the requestor computing device is a cognitive computing system that performs operations on the final minimized natural language content without exposing an identity of the protected entity.

7. The method of claim 6, wherein the operation performed by the cognitive computing system includes one of an application development operation for developing an application or a debugging operation for debugging an application that operates on the natural language content of the electronic document.

8. The method of claim 1, wherein the requestor computing device comprises a cognitive decision support system that performs operations for generating a decision support output, and wherein the requestor computing device performs, in an application development environment of the requestor computing device, an application development operation for developing an application of the cognitive decision support system based on processing of the final minimized natural language content of the electronic document by the cognitive decision support system, without exposing an identity of the protected entity to the application development environment.

9. A computer program product comprising a computer readable storage medium having a computer readable program stored therein, wherein the computer readable program, when executed by a data processing system, causes the data processing system to:

receive, by an iterative personally identifiable information minimization (IPIIM) engine executing in the data processing system, an electronic document comprising natural language content having a mention of a protected entity;

apply, by the IPIIM engine, natural language processing and analytic analysis on the natural language content to obfuscate the mention of the protected entity and thereby generate a first minimized natural language content, wherein the obfuscated mention of the protected entity is indicated to be a focus in the first minimized natural language content;

automatically process, by a question answering computing system, the first minimized natural language content, as input to the question answering computing system, to generate a first listing of one or more candidate answers and corresponding confidence scores, wherein the one or more candidate answers specify predictions of the protected entity, in the mention of the protected entity, prior to the obfuscation of the mention of the protected entity, and wherein the question answering computing system comprises artificial intelligence computer logic configured to predict an answer corresponding to the focus of the input to the question answering computing system;

determine, by the IPIIM engine, whether or not the first minimized natural language content is sufficiently obfuscated based on the first listing of one or more candidate answers and corresponding confidence scores, wherein the first minimized natural language content is determined to not be sufficiently obfuscated in response to a correct identity of the protected entity being present in a candidate answer, of the one or more candidate answers, which has a corresponding confidence score equal to or above a predetermined threshold confidence score; and in response to determining that the first minimized natural language content is sufficiently obfuscated, provide the first minimized natural language content as a final minimized natural language content of the electronic document for processing by a requestor computing device.

10. The computer program product of claim 9, wherein the computer readable program further causes the data processing system, in response to determining that the first minimized natural language content is not sufficiently obfuscated, to iteratively perform additional minimizations of elements present in the natural language content to increase obfuscation/minimization of elements in the natural language content until a sufficient level of obfuscation is achieved to cause the question answering computing system to not include the correct identity of the protected entity in the first listing of one or more candidate answers with a corresponding confidence score equal to or higher than a predetermined threshold confidence score.

11. The computer program product of claim 9, wherein the computer readable program further causes the data processing system, in response to determining that the first minimized natural language content is not sufficiently obfuscated, to:

automatically perform obfuscation of one or more additional elements of the first minimized natural language content to generate second minimized natural language content, wherein the obfuscation of the one or more additional elements comprises designating each of the one or more additional elements as foci for answer generation by the question answering computing system;

process, by the question answering computing system, the second minimized natural language content to generate a second listing of one or more candidate answers and corresponding confidence scores;

determine, by the IPIIM engine, whether or not the second minimized natural language content is sufficiently obfuscated based on the second listing of one or more candidate answers and corresponding confidence scores; and in response to determining that the second minimized natural language content is sufficiently obfuscated, provide the second minimized natural language content as a final minimized natural language content of the electronic document for processing by the requestor computing device.

12. The computer program product of claim 9, wherein the computer readable program further causes the data processing system to receive a listing of protected entities whose identities are to be protected in content of electronic documents, wherein applying, by the IPIIM engine, natural language processing and analytic analysis on the natural language content to obfuscate the mention of the protected entity and thereby generate the first minimized natural language content comprises identifying mentions in the natural language content that match an entity in the listing of protected entities.

13. The computer program product of claim 9, wherein processing, by the question answering computing system, the first minimized natural language content to generate the first listing of one or more candidate answers and corresponding confidence scores comprises:

generating a first input question based on the first minimized natural language content; and processing the first input question by the question answering computing system at least by applying one or more queries to a reference document corpus to generate the first listing of one or more candidate answers.

14. The computer program product of claim 9, wherein the requestor computing device is a cognitive computing system that performs operations on the final minimized natural language content without exposing an identity of the protected entity.

15. The computer program product of claim 14, wherein the operation performed by the cognitive computing system includes one of an application development operation for developing an application or a debugging operation for debugging an application that operates on the natural language content of the electronic document.

16. The computer program product of claim 9, wherein the requestor computing device comprises a cognitive decision support system that performs operations for generating a decision support output, and wherein the requestor computing device performs, in an application development environment of the requestor computing device, an application development operation for developing an application of the cognitive decision support system based on processing of the final natural language content of the minimized electronic document by the cognitive decision support system, without exposing an identity of the protected entity to the application development environment.

17. An apparatus comprising:
a processor; and
a memory coupled to the processor, wherein the memory comprises instructions which, when executed by the processor, cause the processor to:

receive, by an iterative personally identifiable information minimization (IPIIM) engine executing on the processor, an electronic document comprising natural language content having a mention of a protected entity;

apply, by the IPIIM engine, natural language processing and analytic analysis on the natural language content to obfuscate the mention of the protected entity and thereby generate a first minimized natural language content, wherein the obfuscated mention of the protected entity is indicated to be a focus in the first minimized natural language content;

automatically process, by a question answering computing system, the first minimized natural language content, as input to the question answering computing system, to generate a first listing of one or more candidate answers and corresponding confidence scores, wherein the one or more candidate answers specify predictions of the protected entity, in the mention of the protected entity, prior to the obfuscation of the mention of the protected entity, and wherein the question answering computing system comprises artificial intelligence computer logic configured to predict an answer corresponding to the focus of the input to the question answering computing system;

determine, by the IPIIM engine, whether or not the first minimized natural language content is sufficiently obfuscated based on the first listing of one or more candidate answers and corresponding confidence scores, wherein the first minimized natural language content is determined to not be sufficiently obfuscated in response to a correct identity of the protected entity being present in a candidate answer, of the one or more candidate answers, which has a corresponding confidence score equal to or above a predetermined threshold confidence score; and in response to determining that the first minimized natural language content is sufficiently obfuscated, provide the first minimized natural language content as a final minimized natural language content of the electronic document for processing by a requestor computing device.

18. The apparatus of claim 17, wherein the instructions further cause the processor, in response to determining that the first minimized natural language content is not sufficiently obfuscated, to iteratively perform additional minimizations of elements present in the natural language content to increase obfuscation/minimization of elements in the natural language content until a sufficient level of obfuscation is achieved to cause the question answering computing system to not include the correct identity of the protected entity in the first listing of one or more candidate answers with a corresponding confidence score equal to or higher than a predetermined threshold confidence score.

19. The apparatus of claim 17, wherein the instructions further cause the processor to receive a listing of protected entities whose identities are to be protected in content of electronic documents, wherein applying, by the IPIIM engine, natural language processing and analytic analysis on the natural language content to obfuscate the mention of the protected entity and thereby generate the first minimized natural language content comprises identifying mentions in the natural language content that match an entity in the listing of protected entities.

20. The method of claim 1, wherein the question answering computing system comprises a multi-focus factoid question answering system comprising artificial intelligence computer logic configured to predict entity identities for a plurality of foci in an input to the question answering computing system.

* * * * *